United States Patent

[11] 3,575,196

| [72] | Inventors | Rocco Anthony Marrese<br>1024 N. Belleforte Ave., Oak Park, Ill. 60302;<br>William T. O'Sullivan, 1323 Asland, River Forest, Ill. 60305 |
|---|---|---|
| [21] | Appl. No. | 790,372 |
| [22] | Filed | Jan. 10, 1969 |
| [45] | Patented | Apr. 20, 1971 |

[54] CLOSED EXHAUST DISCHARGE SYSTEM FOR ANESTHESIA MACHINES
8 Claims, 4 Drawing Figs.

[52] U.S. Cl. .................................................. 137/312, 128/185, 137/612.1, 137/614.2
[51] Int. Cl. .................................................. A61m 17/00
[50] Field of Search .......................................... 128/185, 188; 137/312, 612.1, 614.2; 251/(N.V.)

[56] References Cited
UNITED STATES PATENTS

| 741,828 | 10/1903 | Presnell | 137/312X |
| 940,453 | 11/1909 | Fondren | 137/614.2X |
| 1,339,244 | 5/1920 | Willcox | 137/312 |
| 1,959,105 | 5/1934 | McCarthy | 251/282X |
| 3,276,446 | 10/1966 | Hay | 128/188 |

Primary Examiner—William F. O'Dea
Assistant Examiner—Richard Gerard
Attorney—Dominik, Knechtel and Godula ABSTRACT: A relief valve for anesthetic gas line which is spring loaded to conventionally discharge overloading anesthetic gas into the surrounding atmosphere, and which further is provided with a valve assembly for connection to a closed system so that the overloading anesthetic gas is retained with the closed system and is not discharged to the surrounding atmosphere. The open system of the valve is maintained by making the spring loaded valve operational, and the closed system is effected by closing the spring loaded valve so that overloading anesthetic gas is directed through the valve assembly into the closed system, preferably a surgical room vacuum line.

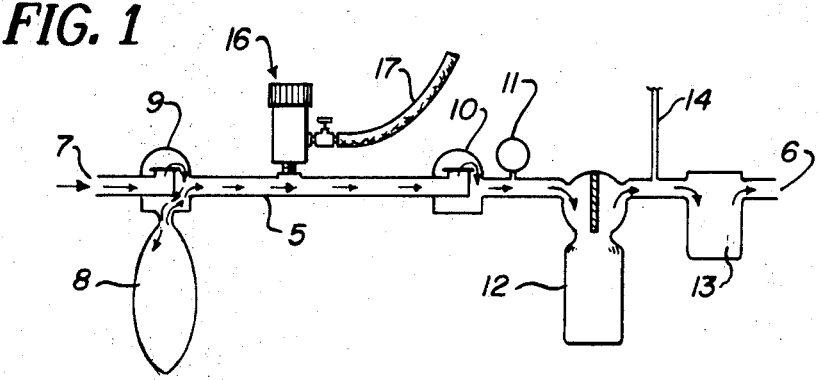
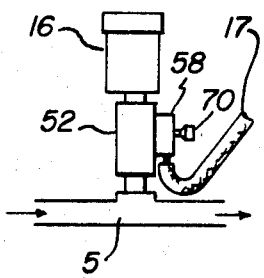
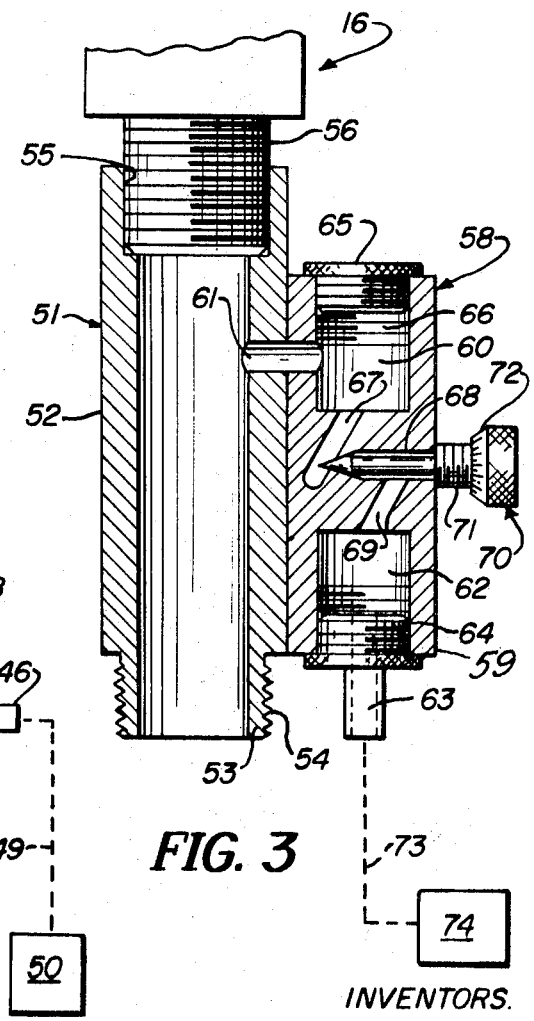
INVENTORS.
R. Anthony Marrese M.D.
BY William T. O'Sullivan
Dominik, Knechtel & Godula
ATTYS.

CLOSED EXHAUST DISCHARGE SYSTEM FOR ANESTHESIA MACHINES

This invention relates to a relief valve mountable on anesthetic gas lines in surgical rooms so that overloading anesthetic gas may be selectively directed into a closed system without discharging into the atmosphere of the surgical room.

Relief valves have been used in association with anesthesiology machines, and such valves have been particularly used with semiclosed circular carbon dioxide absorber systems in which gas flow rates in excess of the patient's absorption and consumption rates must be handled by such pressure relief or "pop-off" valves. In addition to preventing excessive pressure buildup in the patient anesthesia circle, such valves also permit elution of carbon dioxide gasses which may possibly be retained.

The relief valves now available are generally spring-loaded in which a plate valve is normally urged against the valve seat of a gas pressure outlet in the gas line of an anesthesia machine. When the pressure exceeds predetermined levels, the plate valve is unseated and the gas escapes into the surrounding atmosphere through vents or the like in closure caps on the relief valve. The venting or escape of these anesthetic gases into the surgical room atmosphere is a problem of increasing concern to anesthesia personnel because of their pharmacological effects which may take the form of discomfort or even cytotoxicity. This problem attains serious proportions because of the proximity of surgical room personnel to the anesthesia machine and to the relief valve. It is therefore desirable to provide a means for venting or directing the anesthetic gases into a closed system, and effecting such direction of the gases without objectionably altering the desired pressure levels of the primary patient anesthesia circle system.

It is likewise desirable to obtain a relief valve and means for directing overloading anesthetic gases into closed systems so that an election is still available for discharging anesthetic gases into the atmosphere, if desired. If adequate means are not available for conveying and collecting the overloading gases in a closed system, then it would be desirable to retain the conventional spring-loaded operation for atmospheric discharge. In any event, a freedom of choice is available to the user with a relief valve and system which allows conventional discharge of overloading gas into the atmosphere, or directing said gas into a closed system and out of contact with the atmosphere.

It is accordingly one important object of the present invention to provide a new and improved relief valve for an anesthesia machine in which overloading gases are directed into a closed system so that surgical room personnel need not make undesirable contact with such gases.

Yet another important object of the invention is to provide a new and improved relief valve in the patient anesthesia circle wherein overloading anesthetic gases may be quickly, efficiently and reliably diverted into a closed system without upsetting the desired levels of pressure or operation in said circle.

Yet another important object of the invention is to provide an improved relief valve for diverting overloading gases into a closed system, which valve has adapting means for mounting to a conventional anesthetic gas line in an anesthesia machine apparatus.

Yet another important object of the invention is to provide a relief valve mounting assembly which can be secured to a conventional anesthetic gas conduit, and which further has means for mounting conventional spring-loaded relief valves for such anesthetic gas machines.

Another object is to provide an improved patient anesthesia circle system in which overloading anesthetic gases may be diverted into closed systems such as surgical room vacuum lines.

Another object is to provide a patient anesthesia circle assembly in which a closed system may be quickly and simply established for directing anesthetic gases out of conventional spring-loaded relief valves into flexible tubing connected to surgical room vacuum lines for removal out of the surgical room without contaminating the atmosphere therein.

Objects such as the foregoing are attained, together with still other objects which will occur to practitioners from time to time, by the invention of the following disclosure which includes drawings, wherein:

FIG. 1 is a diagrammatic illustration of features of the patient anesthesia circle with means for directing overloading anesthetic gas into a closed system;

FIG. 2 is a sectional elevational view, on an enlarged scale relative to FIG. 1, of a spring-loaded relief valve with conventional means for discharging gases into the atmosphere, and with means for directing such gases into a closed system;

FIG. 3 is a sectional view in elevation of an adapter unit to be mounted to an anesthetic gas conduit and to receive conventional spring-loaded relief valves, while providing an assembly, of an alternative embodiment, for directing anesthetic gases into a closed system; and FIG. 4 is a portional and highly diagrammatic illustration indicating the adapter and conventional spring-loaded valve of FIG. 3, on a reduced scale, mounted to a anesthetic gas conduit.

Referring to the drawings, particularly FIG. 1, a gas conduit line 5 has an inhalation end 6 by which the patient receives the mixture including anesthetic gases, and an exhalation end 7 into which the patient exhales carbon dioxide and any unabsorbed anesthetic gases.

By way of representative illustration, the anesthesia apparatus is shown as having a rebreathing bag 8, an exhalation check valve 9 to prevent patient intake of the exhaled gases, an inhalation check valve 10 to maintain the flow of anesthetic gas mixture towards the patient, a bag pressure gauge 11, a soda lime canister 12 to absorb carbon dioxide, a vaporizer chamber for the gas anesthetic 13, and an anesthetic gas inlet 14. A relief valve is shown generally as 16 mounted to conduit 5, and flexible tubing 17 represents the closed system to which overloading anesthetic gases are directed.

The relief valve shown generally as 16 is seen in greater detail in FIG. 2. The valve includes a housing 18 of generally cylindrical shape formed by continuous wall 19. One end of the housing has a gas port inlet 20 secured to the continuous wall 19 by bolts such as 21. The gas port inlet has a threaded tubular member 22 which is dimensioned to threadably engage a threaded bore indicated at 23 of conduit 5. The other end of the housing has a repositionable closure or adjusting cap 24 which may be moved by selectively engaging threads 25 on the housing with threads 26 annularly disposed within the cap 24. The top wall of the adjusting cap is shown with a pair of vents, one of which is indicated at 27. A stud capnut 28 passes through threaded passageway 29 in the top wall, and extends through enlarged passageway 30 in top plate 31 secured to the top edges of continuous wall 19 by means such as bolts 32. A disc portal valve 33 is secured to stud 28 by top retainer nut 34 and bottom retainer nut 35. These retainer nuts may be repositioned to adjust the tension of the portal valve relative to coil spring 36 which has a bottom disc valve or plate 37 secured to the bottom final turn of the spring. Valve disc 37 is normally urged against valve seat 38 of gas port inlet 20. When the anesthetic gas pressure against lowered disc plate 37 exceeds the tension of spring 36, then disc valve 37 will become unseated and gas will move through the chamber 39 of the relief valve, through passageway 30 and out of vents 27 into the surrounding atmosphere.

A valve assembly shown generally as 42 is shown with threaded end 43 engaged within threaded opening 44 in the continuous wall 19 of the housing. The valve assembly includes a body member 45, a mounting plug end 46 and a passageway 47 extending through the body member, the threaded end and the mounting plug to communicate with chamber 39 of the relief valve. A needle valve 48 is threadably mounted in the body member 45 to selectively reduce the size of the passageway 47. The valve assembly is joined to a closed system which conveys the overloading anesthetic gases along a closed path indicated by dotted line 49 into a closed collection means diagrammatically indicated at 50.

When it is desired to direct the overloading anesthetic gases into the closed system, the adjusting cap 24 is turned downwardly relative to the illustration of FIG. 2 until cover plate 31 is contacted by the top wall of the cap 24. The top surface of top wall or plate 31 will then close the vents 27 to prevent further discharge of the overloading gases into the atmosphere. All the gases will be diverted into the closed system according to selected pressure levels by adjusting needle valve 48. Such gases will be conveyed into a closed path such as flexible tubing 17 and then move into collecting means such as a surgical room vacuum line which may be illustrated by the diagrammatic indication at 50.

An alternative embodiment is shown in the view of FIGS. 3 and 4 wherein a cylindrical adapter housing 51 has a continuous wall 52 which is modified at one end to obtain a reduced diameter stub or tubular member 53 threaded at 54. The tubular member 53 is dimensioned to threadably engage a threaded bore in the conduit line such as 5. The other end of the adapter housing has a threaded bore or bore socket 55 which is dimensioned to correspond to the diameter of the threaded bore in the conduit line such as 5. Such threaded bore will removably receive threaded tubular member 56 of the conventional spring-loaded relief valve 16. Overloading anesthetic gases will move through chamber 57 of the adapter housing and into relief valve 16 when the pressure of such gases exceeds the tension of a spring such as 36 in the relief valve.

A valve assembly 58 is shown secured to continuous wall 52 of the adapter housing, and the securing means may be welds or the like, which are not shown. The valve assembly includes a body member 59 which has a receiving chamber 60 communicating by way of passageway 61 with chamber 57 in the adapter housing. The body member also has an outlet chamber 62 which empties into mounting outlet plug 63. The mounting plug may have a threaded tubular portion 64 which engages threads within discharge chamber 62. Receiving chamber 60 may likewise be closed by plug 65 having a similar threaded tubular member 66 engaging threads within the receiving chamber. A receiving angular path 67 communicates with a lateral path 68 and an angular discharge path 69. A micrometer-type needle valve 70 is advanced along the lateral path 68 through threaded collar 71 to selectively open and close communication between receiving chamber 60 and discharge chamber 64. Scale readings or the like may be provided at 72 on the needle valve.

The adjusting cap of the relief valve 16 will be closed as before so that no gases may be discharged into the atmosphere, and the micrometer needle valve 70 will then be adjusted to selectively attain desired pressure levels in directing overloading anesthetic gases through the valve assembly, into a closed collecting path 73 and into collecting means 74. The collecting means may likewise be flexible tubing such as 17 which joins the valve assembly to collecting means such as a surgical room vacuum supply, which may be diagrammatically indicated at 74.

The adapter housing with the valve assembly mounted thereon allows the improved relief valve to be quickly and conveniently fixed to conventional anesthesia apparatus having conventional means to receive known relief valves such as those indicated herein. It may also be mounted to other related equipment such as mechanical ventilators, nonrebreathing anesthesia circuits and the like.

The invention may now be practiced in the various ways which will occur to practitioners, and it should be understood that such practices will constitute a part of the present invention so long as they fall within the terms of the following claims as given further meaning by the language of the preceding specification.

We claim:

1. In a relief valve for a gas anesthesia line in a machine placed in a surgical room, said relief valve having a housing with a gas inlet port, means at said inlet port to mount said relief valve to the gas anesthesia line to provide communication therebetween, a gas discharge in said housing for pressure overloads, a spring-loaded valve inside the housing which is normally urged to close said gas inlet port, a repositionable closure on one end of said housing to control passage of said gas through said gas discharge, and said closure having means to adjust the tension of said spring, the improvement which includes a gas diverting body member mounted on said housing, a passageway in said gas diverting body member communicating with the interior of said housing, and mounting means on said gas diverting body member for receiving a closed system discharge means to collect overloaded gases without discharge into the atmosphere of a surgical room.

2. In a relief valve as in claim 1 wherein said body member includes a valve assembly having a needle valve to selectively reduce the passageway in said body member mounted on said relief valve housing, and said mounting means on said body member being a mounting tubular plug with a plug passageway communicating with the body member passageway, said mounting plug dimensioned to removably receive one end of a flexible tubing to convey anesthetic gas through said tubing and to said closed system.

3. In a relief valve as in claim 1 wherein said relief valve includes an adapter housing, a gas inlet port at one end of said adapter housing, means on said gas inlet port to removably secure said adapter housing to said anesthetic gas line, a threaded passageway at the opposite end of the adapter housing for mounting said relief valve thereon, said spring-loaded valve normally biased to close the end of the relief valve mounted to said adapter housing to passage of anesthetic gas therethrough, and said gas diverting body member including a valve assembly having a needle valve to selectively reduce the passageway in said body member communicating with the interior of the adapter housing so that any overloaded anesthetic gas may be selectively withdrawn from the gas line directly from said adapter housing through said valve assembly, and into the closed system.

4. In a relief valve as in claim 3 wherein said valve assembly has an outlet mounting member, said outlet mounting member being substantially tubular and of predetermined dimensions to sealingly receive the inside diameter of an elastomeric flexible tubing for conveying the anesthetic gas through said tubing and to said closed system, and said valve assembly including a receiving chamber for the anesthetic gas, and a discharge chamber communicating with said tubular mounting outlet, wherein said needle valve selectively opens and closes a path between said receiving and discharge chambers.

5. In a relief valve as in claim 1 and further including an anesthetic line having a respiratory gas conduit with an inhalation end and an opposite exhalation end, a gas outlet opening in said conduit, said gas inlet port of said relief valve being removably mounted to said gas outlet opening, and a valve assembly communicating with said relief valve, said closed system means mounted to said valve assembly for conveying any overloading anesthetic gas out of the gas conduit without discharge into the atmosphere of a surgical room.

6. A relief valve and anesthetic line system as in claim 5 in which said closed system includes a vacuum line connected to the outlet of said valve assembly to discharge any overloading anesthetic gas into said vacuum line out of contact with the environment of a surgical room.

7. In a relief valve, anesthetic line and closed vacuum line system as in claim 6 wherein said gas diverting body member includes said valve assembly, and a needle valve in said valve assembly to selectively close the gas diverting body member passageway.

8. In a relief valve as in claim 1 wherein said body member includes a valve assembly to control the discharge of overloading anesthetic gas into said closed system, and said mounting means on said body member being a mounting tubular plug with a plug passageway, said mounting plug dimensioned to receive an end of a conduit to convey anesthetic gas through said closed system.